J. W. PHILLIPS.
DEVICE FOR CLEANING SILVERWARE.
APPLICATION FILED MAR. 10, 1913.

1,071,338.

Patented Aug. 26, 1913.

Witnesses:
Jno. M. Sweeney
A. W. Cooper

Inventor:
John Warne Phillips
By Michael J. Stark Sons
Attorneys

UNITED STATES PATENT OFFICE.

JOHN WARNE PHILLIPS, OF CHICAGO, ILLINOIS.

DEVICE FOR CLEANING SILVERWARE.

1,071,338.  Specification of Letters Patent.  Patented Aug. 26, 1913.

Application filed March 10, 1913. Serial No. 753,323.

*To all whom it may concern:*

Be it known that I, JOHN WARNE PHILLIPS, a citizen of the United States, and a resident of the city of Chicago, in the county of Cook and State of Illinois, have invented certain new and useful Improvements in Devices for Cleaning Silverware; and I do hereby declare that the following description of my said invention, taken in connection with the accompanying sheet of drawings, forms a full, clear, and exact specification, which will enable others skilled in the art to which it appertains to make and use the same.

My invention relates to improvements in a device for cleaning silverware, and it consists, essentially, in the novel and peculiar combination of parts and details of construction, as hereinafter first fully set forth and described, and then pointed out in the claims.

Figure 1:
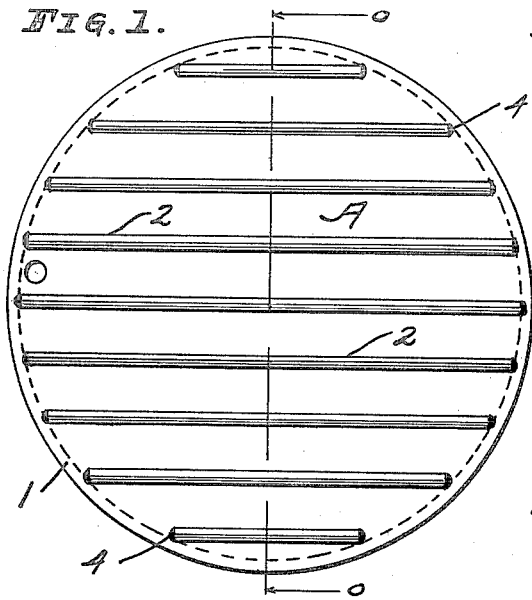
Figure 2:
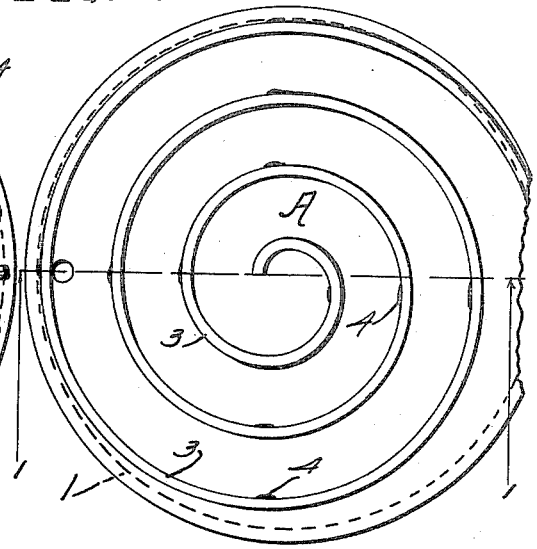
Figure 3:
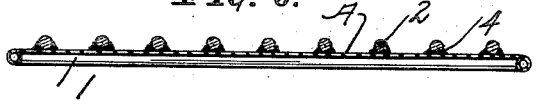
Figure 4:
Figure 5:
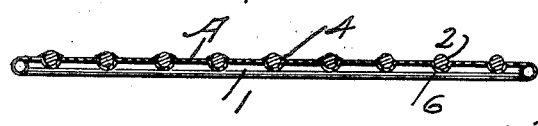
Figure 6:
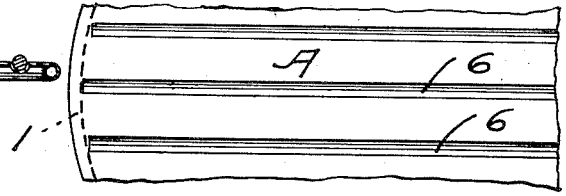

In the sheet of drawings already referred to, which serves to illustrate my said invention more fully, Figure 1 is a plan of my device for cleaning silverware; Fig. 2, a plan of a modification thereof; Fig. 3, a cross section in line 0 0 of Fig. 1; Fig. 4, a similar section in line 1 1 of Fig. 2; Fig. 5, a cross section of a slightly modified type of construction; Fig. 6, a plan of a fragment of said modified type, and Fig. 7, a plan of still another modification.

Like parts are designated by corresponding characters or symbols of reference in all the figures of the drawing.

The aim and object of my invention is the provision of simple, cheap, and efficient means whereby silverware may be thoroughly cleansed from oxid, tarnish, spots, and the like, without the attendant manual labor and the employment of cleansing powders, such as whiting, as is now necessary. Another end sought is the production of a utensil which is within the range of the pocketbook of every housewife; an article that will perfectly perform the functions outlined above, and one which will find its niche in the properly equipped kitchen pantry.

Figure 7:
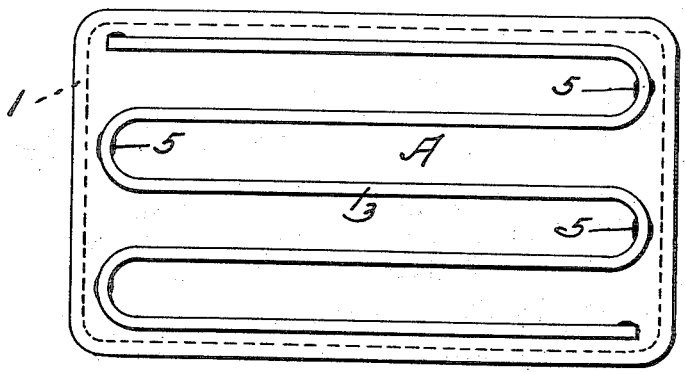

A, in the drawings, represents a metallic plate, preferably zinc, which may be of circular, rectangular, or any other desired outline, said plate being provided around its outer edge with a downwardly projecting bead 1, to stiffen the same. On the top of this plate are secured by means of solder, or other positive means of union, a series of wires 2, which wires are preferably of iron heavily tinned to prevent rust. Said wires, instead of being in parallel lines as in Fig. 1, may be formed from a single wire arranged in a flat spiral, as at 3 in Fig. 2, in which case the same is united with the plate or base A by solder or other uniting material, as at 4. In the case of a rectangular plate or base A being employed, the wire 3 may be formed in a series of return bends, as shown in Fig. 7, and united to said plate or base at 5. When a series of single wires are used, as in Fig. 1, a series of depressions 6 may be formed in plate A to receive the wires 2, these depressions facilitating the assembling of the device and the union of the said wires with the said plate. This device is adapted to be dropped into a vessel, on the bottom thereof, which vessel may be of wood or fiber, as a pail or wash tub; or it may be of tinware, crockery, or glassware. Contained in this vessel is a liquid solution, the constituent elements of which are water, common salt, and washing soda or sodium bicarbonate, which solution may be either hot or cold as desired. Into this solution is immersed the silverware to be cleansed, it being essential that some part of said ware be in contact with one, at least, of the wires 2 or 3. After being immersed a very short interval of time, the articles may be removed from the solution, when it will be found that all tarnish, oxid, or other spots have disappeared therefrom, and all that is then necessary, is to rub dry the goods with a dry, soft cloth, in order to reproduce the original luster. This cleansing results from the electro-chemical action set up between the silver and the zinc, through the tinned iron rods, in the solution mentioned above. It is a necessary factor to the successful operation of this device that there be a great difference in the electro-chemical power of the base plate A and the articles to be cleansed.

In some instances I may make the base plate A from a series of strips of zinc or other high electro-positive material, superimposing upon and uniting with the same, strips of a lesser electro-chemical power.

It will thus be seen that my device, when produced in any of the forms outlined above, forms a serviceable article for the use in households, restaurants, hotels, and the like, for the purpose stated.

Having thus fully described my invention, I claim as new and desire to secure to myself by Letters Patent of the United States:

1. As a new article of manufacture, a device of the class described comprising a sheet-metallic zinc base plate and tinned wires directly soldered to one face of said base plate.

2. As a new article of manufacture, a device of the class described comprising a sheet metallic zinc base plate, there being a series of depressions formed in the face of said base plate, and tinned rods resting in said depressions and directly soldered therein.

3. As a new article of manufacture, a device of the class described, comprising a sheet metallic zinc base plate and a single, continuous, tinned wire soldered to one face thereof, said wire being bent in a plane parallel to said base plate so as to divide the face of said plate into a plurality of zones.

4. As a new article of manufacture, a device of the class described, comprising a sheet metallic zinc base plate and a single, continuous, tinned wire directly soldered to one face thereof, the said wire being formed with a series of return bends forming a plurality of parallel runs of the said wire, dividing said base plate into a plurality of zones.

In testimony whereof I have hereunto set my hand in the presence of two subscribing witnesses.

JOHN WARNE PHILLIPS.

In the presence of—
WILLIAM O. STARK,
W. HARDING.